(12) United States Patent
Mavuri et al.

(10) Patent No.: US 10,422,246 B2
(45) Date of Patent: Sep. 24, 2019

(54) BEARING HOUSING WITH IMPINGEMENT COOLING SYSTEM

(71) Applicant: GENERAL ELECTRIC COMPANY, Schenectady, NY (US)

(72) Inventors: Rajesh Mavuri, Bangalore (IN); Sendilkumaran Soundiramourty, Bangalore (IN)

(73) Assignee: General Electric Company, Schenectady, NY (US)

(*) Notice: Subject to any disclaimer, the term of this patent is extended or adjusted under 35 U.S.C. 154(b) by 457 days.

(21) Appl. No.: 15/332,526

(22) Filed: Oct. 24, 2016

(65) Prior Publication Data

US 2018/0112553 A1 Apr. 26, 2018

(51) Int. Cl.

| F01D 25/12 | (2006.01) |
| F16C 37/00 | (2006.01) |
| F01D 5/02 | (2006.01) |
| F01D 25/16 | (2006.01) |
| F01D 25/24 | (2006.01) |
| F04D 29/053 | (2006.01) |
| F04D 29/056 | (2006.01) |
| F04D 29/58 | (2006.01) |
| F04D 29/32 | (2006.01) |

(52) U.S. Cl.
CPC ....... *F01D 25/125* (2013.01); *F04D 29/0563* (2013.01); *F04D 29/321* (2013.01); *F04D 29/584* (2013.01); *F16C 37/00* (2013.01); *F16C 2360/23* (2013.01); *Y02T 50/671* (2013.01); *Y02T 50/675* (2013.01)

(58) Field of Classification Search
CPC .... F01D 25/125; F04D 29/0563; F16C 37/00; F16C 37/007
See application file for complete search history.

(56) References Cited

U.S. PATENT DOCUMENTS

| 4,542,623 A | 9/1985 | Hovan et al. |
| 4,561,246 A | 12/1985 | Hovan |
| 4,968,158 A | 11/1990 | Atkinson et al. |
| 5,186,547 A * | 2/1993 | Muhl ................. B22D 11/1287 384/480 |
| 5,749,660 A * | 5/1998 | Dusserre-Telmon ........ F16C 19/166 384/475 |

(Continued)

FOREIGN PATENT DOCUMENTS

CA 2744226 6/2010

*Primary Examiner* — Richard A Edgar
*Assistant Examiner* — Brian O Peters
(74) *Attorney, Agent, or Firm* — Nixon & Vanderhye P.C.

(57) ABSTRACT

A bearing housing configured to enclose a bearing assembly rotatable supporting a shaft coupled to a rotating assembly of a turbine engine, may include a housing base and a housing cover each including a flange for coupling the housing base to the housing cover. The housing cover may include an inner shell and an outer shell radially spaced outward of the inner shell to provide a cavity therebetween. The bearing housing may include a plurality of outlets arranged along an outer surface of the inner shell and configured to spray the pressurized cooling fluid to an inner surface of the housing cover defining the cavity. At least one of the outlets may be configured to spray the pressurized cooling fluid to a region of the inner surface of the housing cover that is adjacent to the flange of the housing cover.

17 Claims, 5 Drawing Sheets

(56) References Cited

U.S. PATENT DOCUMENTS

| | | | |
|---|---|---|---|
| 5,915,843 A * | 6/1999 | Mattera | B22D 11/1287 384/316 |
| 6,286,303 B1 | 9/2001 | Pfligler et al. | |
| 6,409,464 B1 | 6/2002 | Fisher et al. | |
| 8,616,778 B2 * | 12/2013 | Takahashi | B22D 11/1287 384/476 |
| 9,234,439 B2 | 1/2016 | Demitraszek et al. | |
| 2010/0135786 A1 | 6/2010 | Manteiga et al. | |
| 2016/0076449 A1 | 3/2016 | Beier | |

* cited by examiner

BEARING HOUSING WITH IMPINGEMENT COOLING SYSTEM

BACKGROUND OF THE INVENTION

The invention relates generally to bearing housing cooling and, more particularly, to methods and systems related to isothermal cooling of bearing housing in turbine engines by oil impingement.

A turbine engine may include a compressor, a combustor, and a turbine coupled to the compressor. Air entering the compressor is compressed and delivered to the combustor. The combustor can include a plurality of combustor cans to which the compressed air and fuel are delivered to produce high-velocity and high-pressure combustion gases. The combustion gases are ignited to generate a high-speed exhaust gas flow that is discharged to the turbine. The turbine extracts energy from the combustion gases for producing power that may be used, for example, to power the compressor, to power and electrical generator, or to power an aircraft.

The turbine engine may include shafts connecting various sections of the turbine. The shafts may be mounted for rotation about a central axis of the turbine engine relative to a stationary frame of the turbine engine using one or more bearing assemblies housed in a bearing compartment.

As operating speeds of the turbine engines have increased to improve output and efficiency, temperature in the bearing compartments and/or bearing assemblies have also increased. In addition, the temperature of the bearing compartments and/or bearing assemblies have increased due to reduced size of bearing compartments in efforts to reduce the overall size and weight of the turbine engine. Conventional approaches that use, for example, air or fluid to cool the bearing compartments and/or bearing assemblies are not able to maintain the temperature of the bearing compartments and/or bearing assemblies below desired temperatures. In addition, conventional approaches do not provide appropriate distribution of air or fluid to adequately cool the bearing compartment. Without adequate cooling, the bearing assemblies may experience increased wear and tear and/or result in undesirable fluid cooking.

SUMMARY OF THE INVENTION

Exemplary embodiments of this disclosure provide a bearing housing including a plurality of outlets and/or nozzles placed at different locations within a bearing housing to spray cooling fluid to multiple regions of an inside surface of the bearing housing. The outlets and/or nozzles may be positioned such that the cooling fluid is supplied to a top region of the bearing housing and directly to regions of the bearing housing that are exposed to higher heat.

In some embodiments, the regions of the bearing housing that are provided with the additional cooling fluid include joints in the bearing housing. The joints may be formed by coupling different portions of the bearing housing together. In some embodiment, the regions of the bearing housing that are provided with the additional cooling fluid may include an area that include a flange used to couple the different portions of the bearing housing and/or used to couple the bearing housing to a frame of a turbine engine.

Accordingly, embodiments of this disclosure provide for distribution of cooling fluid that allows for a more uniform cooling of the bearing housing than traditional methods. In addition to providing cooling fluid to a top region of the bearing housing, the inventors have identified a benefit in also providing cooling fluid directly to regions with high heat concentration due to the bearing housing being surrounded external heat sources (e.g., by hot core flow in turbine engines). The cooling fluid may be supplied to the additional regions by splitting the flow of the cooling fluid to the multiple regions. The additional outlets and/or nozzles for cooling the additional regions of the bearing housing provide for isothermal behavior of the bearing housing and greater margin on coking limit of the fluid.

In another exemplary embodiment, a turbine engine may include a frame, a shaft disposed inside of the frame, a rotating assembly mounted on the shaft, a bearing assembly rotatably supporting the shaft, and a bearing housing coupled to the frame and configured to enclose and support the bearing assembly. The bearing housing may include a housing base and a housing cover coupled to the housing base, the housing cover including an inner shell and an outer shell radially spaced outward of the inner shell to provide a cavity there between, one of the housing base and the housing cover including a cooling fluid inlet configured to receive pressurized cooling fluid and provide cooling fluid inside of the bearing housing. A plurality of nozzles may be arranged along an outer surface of the inner shell and configured to receive the pressurized cooling fluid and spray the pressurized cooling fluid to an inner surface of the housing cover defining the cavity, wherein at least one of the nozzles is configured to spray the pressurized cooling fluid to a joint formed by the coupling of the housing base and the housing cover.

In another exemplary embodiment, a turbine engine may include a frame, a shaft disposed inside of the frame, a compressor mounted on the shaft, a turbine mounted on the shaft, and a bearing housing coupled to the frame and configured to enclose and support a bearing assembly supporting the shaft. The bearing housing may include an outer shell including a flange on an outside surface of the outer shell, an inner shell radially spaced inward of the inner shell to provide a cavity there between, a cooling fluid inlet configured to receive pressurized cooling fluid and provide cooling fluid inside of the bearing housing, and a plurality of outlets circumferentially spaced apart along an outer surface of the inner shell, the outlets being configured to spray the received pressurized cooling fluid to at least a portion of an inner surface of the outer shell and wherein at least one of the outlets is configured to spray the pressurized cooling fluid to a portion of the inner surface of the outer shell that is opposite to the location of the flange on the outside surface of the outer shell.

The embodiments of this disclosure provide for improved heat transfer effectiveness with minimal changes to the structure of the bearing housing and/or bearing assembly.

BRIEF DESCRIPTION OF THE DRAWINGS

Other features and advantages of this disclosure are made apparent in the following descriptions taken in conjunction with the provided drawings wherein are set forth, by way of illustration and example, certain exemplary embodiments of the present invention.

DETAILED DESCRIPTION OF THE INVENTION

Figure 1:
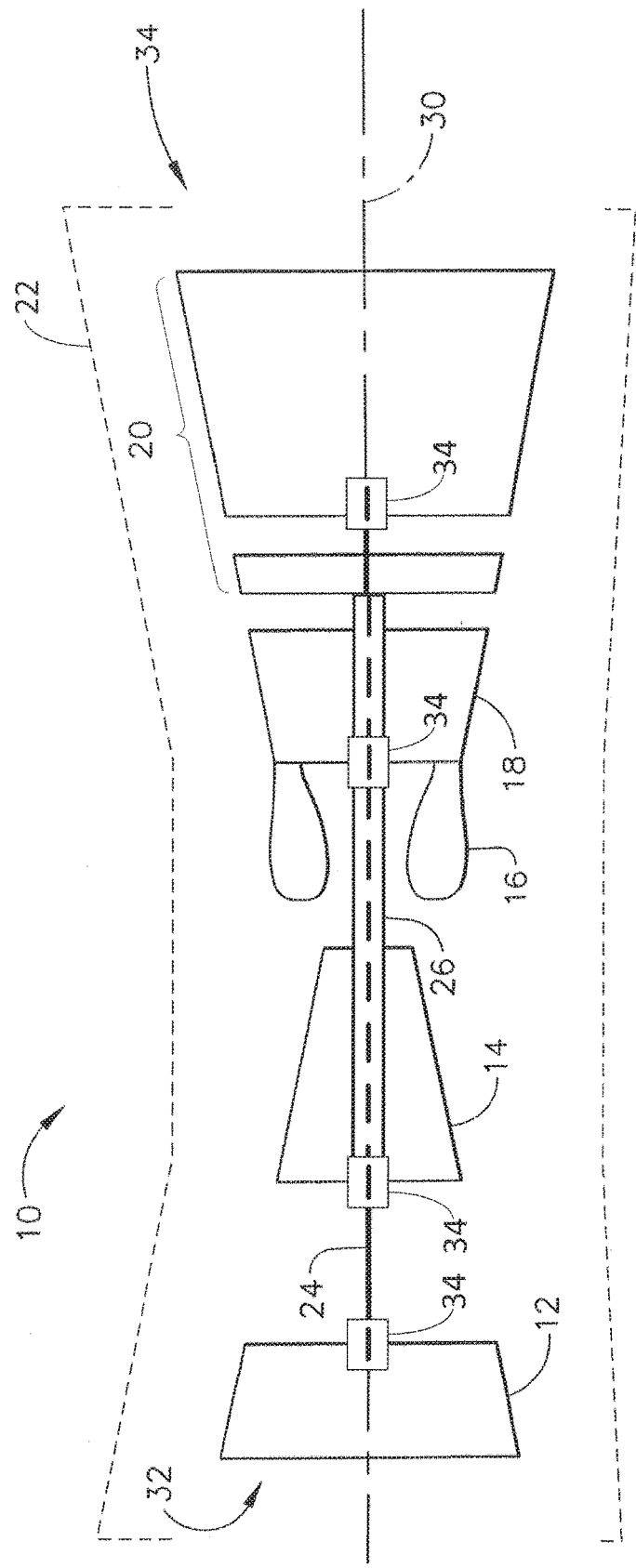
FIG. 1 illustrates gas turbine engine according to an embodiment of the present disclosure.

FIG. 1 illustrates gas turbine engine 10 according to an embodiment of the present disclosure. The gas turbine engine 10 may include a low pressure compressor 12, a high pressure compressor 14, and a combustor 16. The gas turbine engine 10 may also include a high pressure turbine 18, and a low pressure turbine 20. The compressor 12 and the low pressure turbine 20 may be coupled by an inner shaft 24, and compressor 14 and turbine 18 may be coupled by an outer shaft 26. The gas turbine engine 10 may have an axis of symmetry 30 (e.g., a central axis of the gas turbine engine 10) extending from an inlet side 32 of the gas turbine engine 10 aftward to an exhaust side 34 of the gas turbine engine 10 relative to a stationary frame 22 of the gas turbine engine 10. The shafts 24 and 26 may rotate about the axis of symmetry 30. The stationary frame 22 may be a single integral structure or it may include a plurality of individual interconnected sections. While only two shafts are illustrated in FIG. 1, the gas turbine engine 10 may include additional shafts.

During operation, air may flow through low pressure compressor 12 from an inlet side 32 of the gas turbine engine 10 and compressed air may be supplied from low pressure compressor 12 to high pressure compressor 14. Compressed air may then be delivered to combustor 16 where fuel is introduced and burned to generate hot combustion gases. The combustion gases may be discharged to the turbines 18 and/or 20 where the gases are expanded and energy is extracted. The energy extracted from the turbines 18 and/or 20 may be used to drive compressors 12 and/or 14 through shaft 24 and/or an external load (e.g., a propeller or a gear box).

The shafts 24 and/or 26 may be supported for rotation about axis of symmetry 30 relative to a stationary frame 22 by one or more bearing assemblies 34. One or more of the bearing assemblies may be provided within a corresponding bearing housing. The bearing assemblies 34 may include roller bearings and/or ball bearings to support axial and/or radial forces working on the shafts. Each bearing housing may include one or more assemblies therein.

The bearing assemblies and/or the bearing housing are cooled to reduce wear and tear and/or reduce the possibility of fluid cooking. The fluid inside of the bearing housing may include lubricating fluid and/or cooling fluid. In some embodiments, the same fluid is used to cool and lubricate the bearing assembly and/or bearing housing.

The cooling may include impingement cooling. Impingement cooling may include cooling with one or more jets of fluid inside surface of the bearing housing and/or other portions of the bearing assembly. With impingement cooling the inner surface of the bearing housing and/or surface of the bearing assembly are hit with high velocity fluid on a continuous basis. The impingement cooling may be concentrated in areas with high heat load. As discussed in more detail below, the supply of high velocity fluid may be split to provide impingement cooling at multiple locations and specifically at locations with high heat concentration (e.g., at horizontal joints of the bearing housing). While most examples provided in this application are provided with reference to cooling with a fluid, the cooling according to embodiments of this application are not so limited and may include cooling with, for example, air or gas.

Figure 2A:
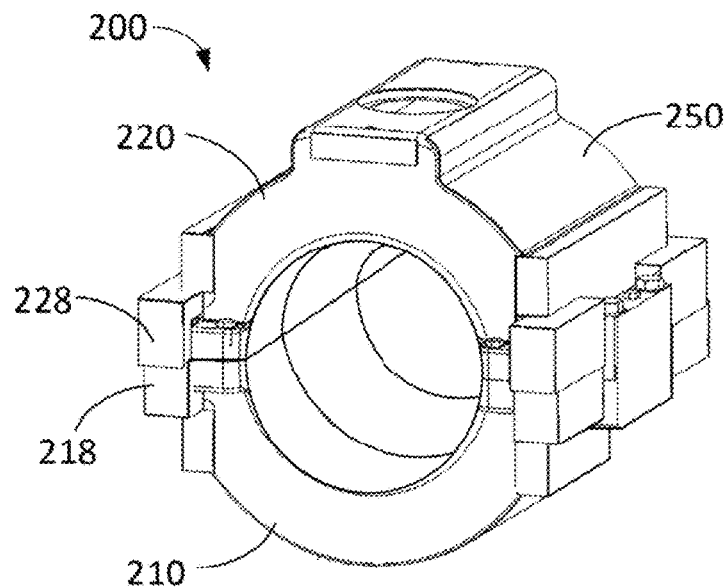
FIGS. 2A and 2B illustrate a bearing housing according to an exemplary embodiment of this disclosure.
Figure 2B:
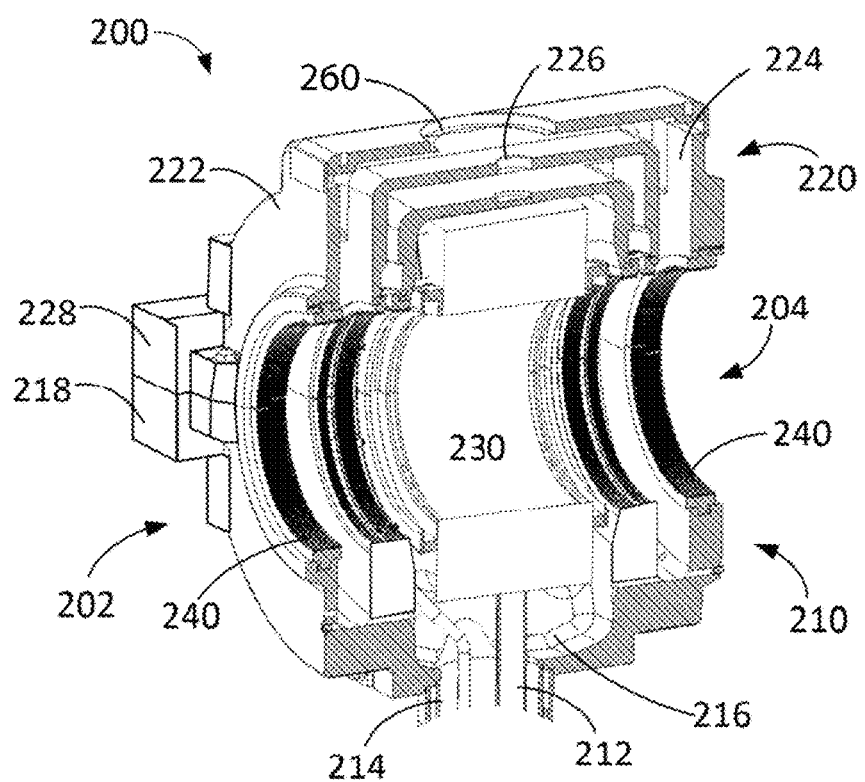

FIGS. 2A and 2B illustrate a bearing housing 200 according to an exemplary embodiment of this disclosure. The bearing housing 200 may be utilized for any of the various bearing assemblies within the gas turbine engine. In one embodiment, the bearing housing 200 may be utilized in the area where external heat is generated and causes the bearing housing 200 to heat up (e.g., in the area of a combustor of the turbine engine and/or a compressor receiving hot air). The bearing housing 200 may include a housing base 210 and a housing cover 220 configured to be coupled to the housing base 210. A bearing assembly 230 mounted around a rotating shaft (not shown in FIGS. 2A and 2B) may be disposed inside of the housing base 210 and the housing cover 220.

The housing base 210 and/or the housing cover 220 may be coupled to a stationary frame of the turbine engine directly or via other structures. The coupling of the housing base 210 to the housing cover 220 may form joints that are approximately parallel to the central axis of the turbine engine. The joints may be horizontal joints that are provided on a same plane or different planes.

The joints may be formed by a flange 218 included in the housing base 210 and a flange 228 included in the housing cover 220. The flange 218 and/or flange 228 may extend along horizontal direction parallel to the central axis of the turbine engine. The flange 218 and/or flange 228 may be used to couple the housing base 210 to the housing cover 220 and/or to couple the bearing housing 200 to the frame of the turbine engine.

In some embodiments, the bearing housing 200 may include more than two housing portions that form more than two horizontal joints and/or vertical joints that extend radially from the central axis of the turbine engine. The housing base 210 and the housing cover 220 may surround the rotating shaft(s) and the bearing assembly 230.

The bearing housing 200 may define an outer surface 222 and an inner surfaces 224 that are spaced axially and/or radially from the outer surface 222. The bearing housing 200 may also define a plurality of cooling passages for cooling fluid, such as oil, to pass through. The cooling passages may be provided adjacent to the outer surface through which the cooling fluid is circulated when the gas turbine engine is running.

The bearing housing 200 may include a first opening 202 on a first end of the bearing housing 200 and a second opening 204 at a second end of the bearing housing axially spaced from the first end. The openings 202 and 204 may include one or more seal rings 240 configured to communicate with the shafts and to prevent pressurized air and/or cooling fluid from exiting the bearing housing 200. The seal rings 240 may also seal the plurality cooling passages from one another and/or seal various compartments of the bearing housing 200 around the rotating shaft.

As shown in FIG. 2B, the housing base 210 may include a cooling fluid inlet 212 to provide cooling fluid to cooling passages formed by the housing base 210 and the housing cover 220, and a cooling fluid outlet 214 to remove cooling fluid from a drainage cavity 216 provided inside of the lower portion of the housing base 210. The cooling fluid inlet 212 may receive pressurized cooling fluid from a cooling fluid supply (not shown in FIG. 2B) and provide the fluid to a passage adjacent to the bearing assembly 230 that is coupled to outlets in the housing cover 220.

As shown in FIG. 2B, the housing cover 220 may include an air inlet 226 to provide air to the air supply cooling passages formed by the housing base 210 and the housing cover 220 and an air outlet 260 to remove air from the air return cooling passages formed by the housing base 210 and the housing cover 220. The air inlet 226 and air outlet 260 may be provided on a top outer surface of the housing cover 220 that is opposite to a bottom outer surface of the housing base 210 including the cooling fluid inlet 212 the cooling fluid outlet 214.

The bearing assembly 230 may comprise bearings such as, for example, a roller bearing, trust bearings, ball bearing, tapered roller bearing, but is not so limited. As shown in FIG. 2A, portions of the bearing housing 200 may be covered with insulation 250 to isolate the bearing housing 200 from hot gases outside of the bearing housing 200.

Figure 3A:
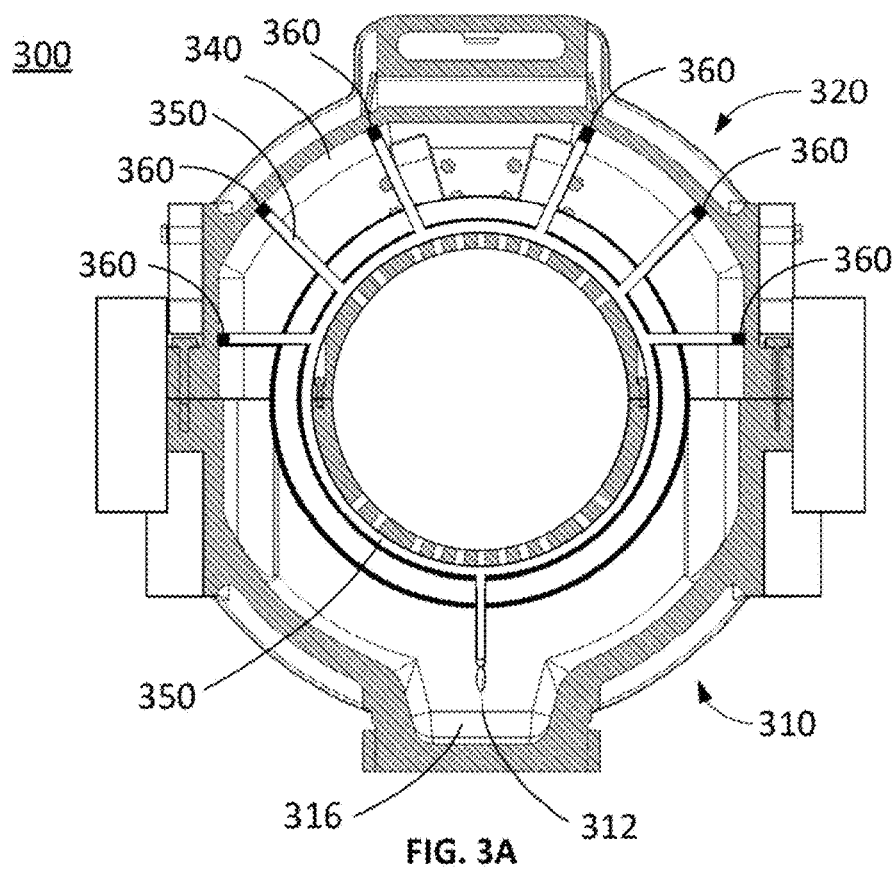
FIGS. 3A and 3B illustrate a bearing housing according to an exemplary embodiment of this disclosure.
Figure 3B:
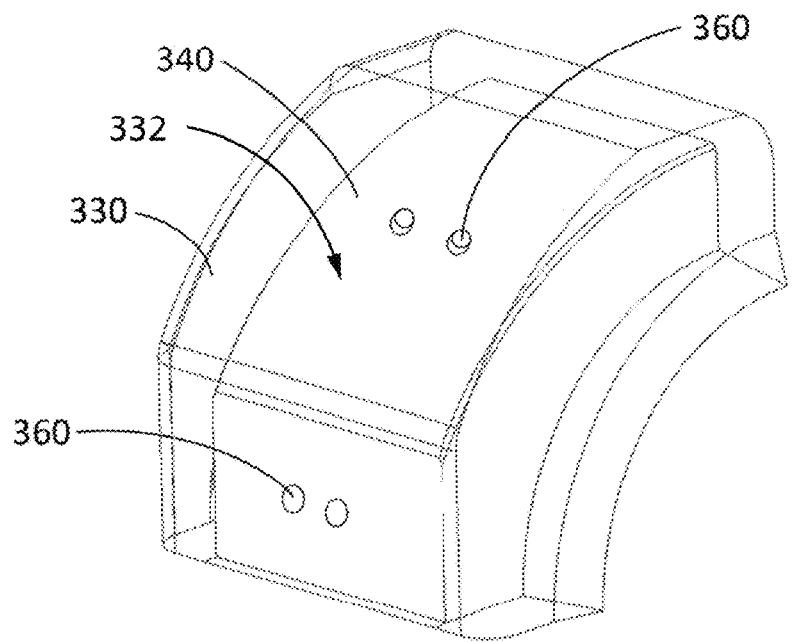

FIGS. 3A and 3B illustrate a bearing housing 300 according to an exemplary embodiment of this disclosure. The bearing housing 300 may be utilized for any of the various bearing assemblies within the gas turbine engine. The bearing housing 300 may include a housing base 310 and a housing cover 320 configured to be coupled to the housing base 310. The coupling of the housing base 310 and the housing cover 320 may form joints 322 that extend along a direction of central axis of the turbine engine and are approximately parallel to the central axis of the turbine engine.

The bearing housing 300 may define an outer shell 330 and an inner shell 340 that are spaced axially from the outer shell 330 to define a cooling passage 332. The cooling passage 332 may extend in a direction of the central axis of the turbine engine and/or extend in a radial direction towards the central axis at the ends of the bearing housing 300. The cooling passage 332 may be provided adjacent to the outer surface of the housing cover 320 where the cooling fluid is circulated when the turbine engine is running.

In FIG. 3A, the inner shell 340 only in the housing cover 320 is illustrated. The housing base 310 may also include an inner shell 340. The inner shell 340 and the outer shell 330 may each include a curved portion and a flat portion. The flat portion may be formed in the area of the flange.

The housing base 310 may include a cooling fluid inlet 312 to provide cooling fluid to cooling passages formed by the housing base 310 and the housing cover 320, and a drainage cavity 316 provided inside of the lower portion of the housing base 310 to collect the cooling fluid. The cooling fluid inlet 312 may be coupled to tubes or cavities 350 included in the inner shell 340 to supply the cooling fluid to outlets 360 provided at an outer surface of the inner shell 340 of the housing cover 320. As illustrated in FIG. 3A, the outer surface of the inner shell 340 may have a curved surface and extend along the central axis of the turbine engine, and the outlets 360 may be spaced from each other along the curved surface. The outlets 360 may be spaced from the inner surface of the outer shell 330. Two or more outlets 360 may be provided next to each other and spaced apart along a direction parallel to the central axis of the turbine engine. The outlets 360 may be arranged in a plurality of rows along a direction parallel to the central axis of the turbine engine with at least two outlets 360 in each row.

The outlets 360 may be configured to spray the cooling fluid against an inner surface of the outer shell 330 in such a manner that the inner surface is continuously bathed with the cooling fluid as it flows due to gravity to the bottom of the housing base 310 and to the drainage cavity 316. As illustrated in FIG. 3A, the outlets may be provided only in the housing cover 320. The outlets 360 may be displaced circumferentially along the outer surface of the inner shell 340 of the housing cover 320. For example, the outlets 360 may be arranged to provide cooling fluid at a top half of the housing cover 320 and near a horizontal region (e.g., near a joint formed by the mating of the housing cover 320 with the housing base 210).

The outlets at a top portion of the housing cover 320 may direct flow of the cooling fluid to an upper half of the bearing housing 300 and the cooling fluid may drain due to gravity to a drain in the housing base 310. In addition, the outlets 360 located below the top outlets 360 may direct flow of the cooling fluid to other portions of the bearing housing 300. While these other portions may already be exposed to some cooling fluid due to the cooling fluid output by the outlets at the upper portion of the bearing housing 300, the additional cooling fluid may be needed in these regions being exposed to heat generated outside of the bearing housing 300. This distribution of the cooling fluid may provide isothermal behavior of the bearing housing 300 and provide for a higher margin on cooling fluid cooking limit To provide the cooling fluid to each of the outlets 360, the flow of the cooling fluid from the same cooling circuit may be split to each of the outlets 360. In one embodiment, one circuit may provide cooling fluid to outlets on one side of the housing cover 320 and another circuit may provide cooling fluid to outlets on an opposite side of the housing cover 320. The circuit may be defined by lanes formed in the inner shell 340 between the outlets and the cooling fluid inlet 312.

The size of the outlet and/or characteristics of a nozzle provided at the outlet may be controlled to provide the desired amount of cooling fluid at each location. In one embodiment, each outlet/nozzle may be configured to provide the same amount of cooling fluid. In another embodiment, the amount of cooling fluid provided at the joint may be more as compared to the amount of cooling fluid provided at other locations. In one embodiment, the outlet providing cooling fluid to the top portion of the housing cover 320 may provide fluid impingement at 60 Btu/hr ft2.F and the outlet providing cooling fluid near the joint of the housing cover 320 may provide fluid impingement at 150 Btu/hr ft2.F.

Nozzles may be provided at the outlets 360. The nozzles may extend radially outward from the central axis of the turbine engine and direct cooling fluid to the inner surface of the outer shell 330. The nozzles may be in flow communication with a cooling fluid supply source (not illustrated in FIGS. 3A and 3B) providing cooling fluid to the nozzle via the fluid inlet 312. In one embodiment, the nozzles may extend outward from the outlets in various directions to effectively provide cooling fluid to regions of the inner surface of the outer shell 330.

Figure 4:
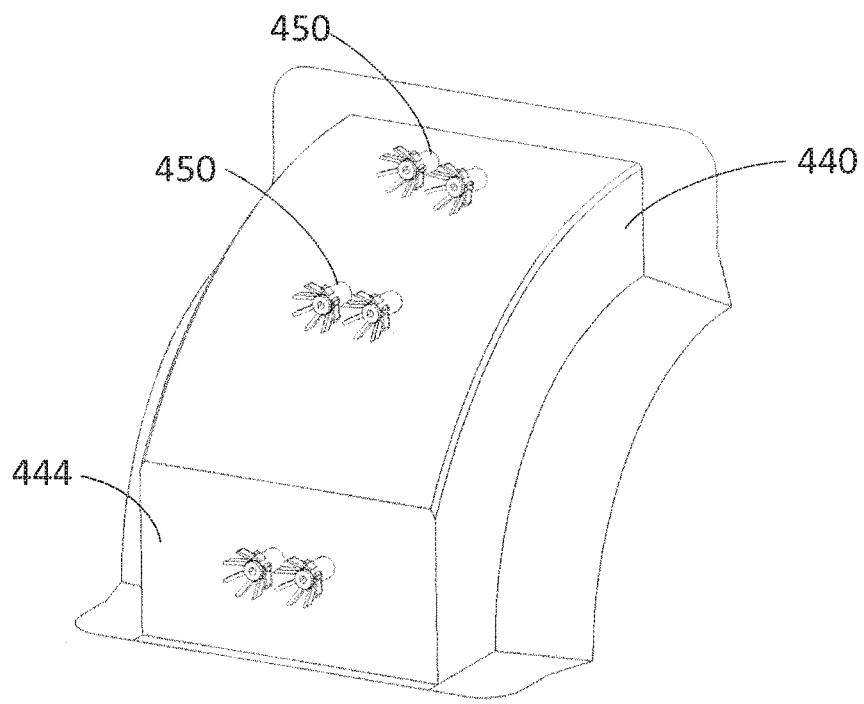
FIG. 4 illustrates an arrangement of nozzles in a bearing housing according to an embodiment of the present disclosure.

FIG. 4 illustrates an arrangement of nozzles in a bearing housing according to an embodiment of the present disclosure. As shown in FIG. 4, the nozzles 450 may be displaced circumferentially along the outer surface of the inner shell 440 of the bearing housing. A plurality of nozzles 450 may be provided on a circular surface 442 of the inner shell 440 and/or a plurality of nozzles 450 may be provided on a flat surface 444 of the inner shell 440. Each cooling fluid circuit may be split to provide the cooling fluid to a plurality of nozzles 450. For example, a single cooling fluid circuit may be split to provide the cooling fluid to two nozzles 450 that are adjacent to each other.

The nozzles 450 may include a structure to spray the cooling fluid in multiple directions. Each nozzle may include a single outlet and a structure to disperse the fluid in multiple directions after the cooling fluid exits the outlet. For example, the nozzle may include a plurality of fins to disperse the cooling fluid in multiple directions or to direct flow to a desired location. In another embodiment, the nozzle may include a plurality of outlets to spray the cooling fluid in multiple directions.

Figure 5:
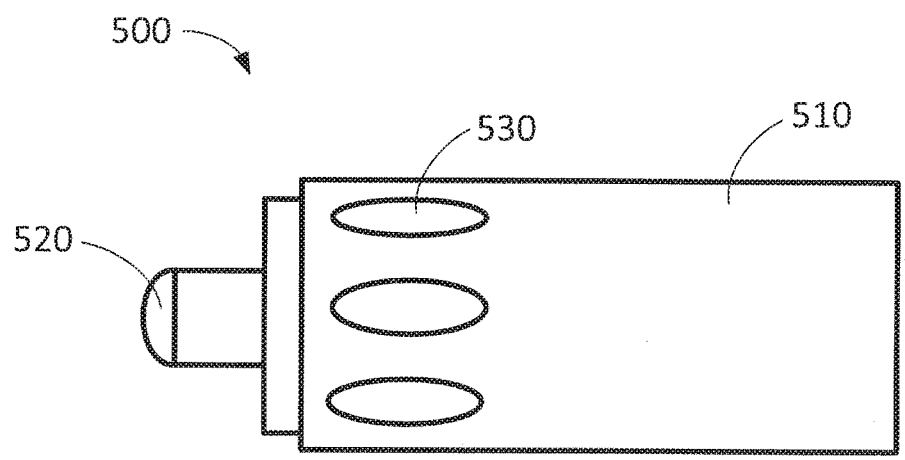
FIG. 5 illustrates a nozzle according to one embodiment of the present disclosure.

FIG. 5 illustrates a nozzle 500 according to one embodiment of the present disclosure. The nozzle 500 may include a cylindrical body 510 and a first outlet 520 provided at a distal end of the nozzle 500. The first outlet 520 may direct the spray of the cooling fluid along a central axis of the cylindrical body 510. The nozzle 500 may include additional outlets 530 located near the distal end of the nozzle 500. The additional outlets 530 may be located around the perimeter of the cylindrical body 510 near the distal end of the nozzle 500. The additional outlets 530 may direct the cooling fluid in multiple directions away from the distal end of the nozzle 500.

Figure 6:
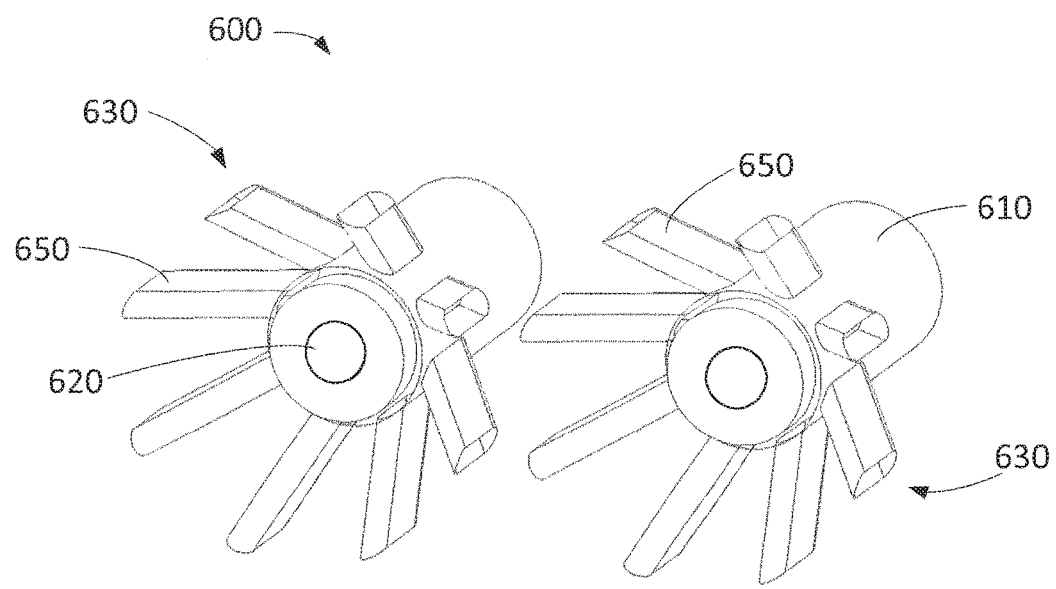
FIG. 6 illustrates a nozzle according to one embodiment of the present disclosure.

FIG. 6 illustrates a nozzle 600 according to one embodiment of the present disclosure. The nozzle 600 may include a cylindrical body 610 and a first outlet 620 provided at a distal end of the nozzle 600. The first outlet 620 may direct the spray of the cooling fluid along a central axis of the cylindrical body 610. The nozzle 600 may include additional outlets 630 located near the distal end of the nozzle 600. The additional outlets 630 may be located around the perimeter of the cylindrical body 610 near the distal end of the nozzle 600. The additional outlets 630 may include tubes 650 extending from the cylindrical body 510 to direct the cooling fluid in multiple directions away from the distal end of the nozzle 600. The tubes 650 may direct the flow of the cooling fluid at desired angle away from the central axis of the nozzle 600. The angle may be selected to provide cooling fluid to a desired portion of the inner surface of the outer shell. In one embodiment, the tubes 650 may direct the flow of the cooling fluid at a 45 degree angle away from the central axis of the nozzle 600.

The outlets provided in the nozzles may be provided with different shapes to achieve the desired flow of the cooling fluid. The nozzles and/or outlets may be configured to provide cooling fluid to the surface to be cooled at specific angles. For example, a nozzle near a flat portion of the outer shell may provide the cooling fluid to the outer shell at a 90 degree angle to the surface. Nozzles at curved portions of the inner shell may also be directed so that the cooling fluid is provided to the outer shell (e.g., curved or flat) at approximately 90 degree angle to the surface being cooled.

The exemplary embodiments of the present disclosure provide the invention(s), including the best mode, and also to enable a person skilled in the art to practice the invention, including making and using any devices or systems and performing any incorporated methods. While specific exemplary embodiments of the present invention(s) are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s).

In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

We claim:

1. A bearing housing for enclosing a bearing assembly configured to rotatably support a shaft coupled to a rotating assembly of a turbine engine, the bearing housing comprising:
    a housing base and a housing cover each including a flange for coupling the housing base to the housing cover, the housing base and housing cover configured to enclose the bearing assembly and support the bearing assembly, the housing cover including an inner shell and an outer shell radially spaced outward of the inner shell to provide a cooling passage therebetween, one of the housing base and the housing cover including a cooling fluid inlet configured to receive pressurized cooling fluid and provide the pressurized cooling fluid inside of the bearing housing, and the housing base including a cooling fluid outlet configured to collect cooling fluid inside of the bearing housing; and
    a plurality of outlets circumferentially spaced apart along an outer surface of the inner shell and configured to spray the pressurized cooling fluid to an inner surface of the outer shell, wherein at least one of the outlets is configured to spray the pressurized cooling fluid to an upper portion of the inner surface of the outer shell and at least one of the outlets is configured to spray the pressurized cooling fluid directly to a region of the inner surface of the outer shell that is adjacent to the flange of the housing cover and above a joint formed by the coupling of the housing base to the housing cover.

2. The bearing housing of claim 1, wherein each outlet includes a plurality of fins configured to disperse the pressurized cooling fluid in different directions.

3. The bearing housing of claim 1, wherein each outlet includes a nozzle including a plurality of outlets provided on a side surface of the nozzle to disperse the pressurized cooling fluid in different directions.

4. The bearing housing of claim 1, wherein each outlet includes a nozzle including a first outlet provided at a distal end of the nozzle, wherein the first outlet is configured to direct pressurized cooling fluid in a direction along a longitudinal axis of the nozzle and a plurality of second outlets provided on a side surface of the nozzle to direct the pressurized cooling fluid in different directions around the distal end of the nozzle.

5. A turbine engine comprising:
    a frame;
    a shaft disposed inside of the frame;
    a rotating assembly mounted on the shaft;
    a bearing assembly rotatably supporting the shaft;
    a bearing housing coupled to the frame and configured to enclose and support the bearing assembly, the bearing housing comprising a housing base and a housing cover coupled to the housing base, the housing cover including an inner shell and an outer shell radially spaced outward of the inner shell to provide a cooling passage therebetween, one of the housing base and the housing cover including a cooling fluid inlet configured to receive pressurized cooling fluid and provide cooling fluid inside of the bearing housing; and
    a plurality of nozzles arranged along an outer surface of the inner shell and configured to receive the pressurized cooling fluid and spray the pressurized cooling fluid to an inner surface of the outer shell, wherein at least one of the nozzles is configured to spray the pressurized cooling fluid to a joint formed by the coupling of the housing base and the housing cover.

6. The turbine engine of claim 5, wherein the joint coupling the housing base and the housing cover includes a horizontal joint that extends parallel to a central axis of the turbine engine, and at least one of the nozzles is configured to direct the pressurized cooling fluid to the horizontal joint formed by the coupling of the housing base and the housing cover.

7. The turbine engine of claim 5, wherein the plurality of nozzles are arranged adjacent to each other along the outer surface of the inner shell and in multiple rows, the rows extending in a direction parallel to a central axis of the turbine engine and each row including at least two nozzles.

8. The turbine engine of claim 5, wherein each nozzle includes a plurality of fins disposed at a distal end of the nozzle configured to disperse the pressurized cooling fluid in multiple directions.

9. The turbine engine of claim 5, wherein each nozzle includes a plurality of outlets provided on a side surface of the nozzle to disperse the pressurized cooling fluid in different directions.

10. The turbine engine of claim 5, wherein each nozzle includes an outlet provided at a distal end of the nozzle configured to direct pressurized cooling fluid in a direction along a longitudinal axis of the nozzle and a plurality of outlets provided on a side surface of the nozzle to direct the pressurized cooling fluid in different directions around the distal end of the nozzle.

11. The turbine engine of claim 5, wherein the rotating assembly includes a turbine and a compressor mounted on the shaft.

12. A turbine engine comprising:
a frame;
a shaft disposed inside of the frame;
a compressor mounted on the shaft;
a turbine mounted on the shaft;
a bearing housing coupled to the frame and configured to enclose and support a bearing assembly supporting the shaft, the bearing housing comprising:
an outer shell including a flange on an outside surface of the outer shell;
an inner shell radially spaced inward of the outer shell to provide a cooling passage therebetween;
a cooling fluid inlet configured to receive pressurized cooling fluid and provide cooling fluid inside of the bearing housing; and
a plurality of outlets circumferentially spaced apart along an outer surface of the inner shell, the outlets being configured to spray the received pressurized cooling fluid to at least a portion of an inner surface of the outer shell, wherein at least one of the outlets is configured to spray the pressurized cooling fluid to a portion of the inner surface of the outer shell that is opposite to the location of the flange on the outside surface of the outer shell.

13. The turbine engine of claim 12, wherein the flange extend in a direction parallel to an axis of the turbine engine.

14. The turbine engine of claim 12, wherein the bearing housing includes a housing base and a housing cover coupled to the housing base, and at least one of the outlets is configured to direct the pressurized cooling fluid to a horizontal joint formed by the coupling of the housing base and the housing cover that extends parallel to a central axis of the turbine engine.

15. The turbine engine of claim 12, wherein the plurality of outlets are arranged in pairs adjacent to each other and in multiple rows, the rows extending in a direction parallel to a central axis of the turbine engine and each row including at least two outlets.

16. The turbine engine of claim 12, wherein each outlet includes a nozzle including a plurality of fins disposed at a distal end of the nozzle configured to disperse the pressurized cooling fluid in multiple directions.

17. The turbine engine of claim 12, wherein each outlet includes a nozzle including a plurality of outlets provided on a side surface of the nozzle to disperse the pressurized cooling fluid in different directions.

* * * * *